United States Patent [19]

Shah et al.

[11] Patent Number: 5,798,398
[45] Date of Patent: Aug. 25, 1998

[54] EPOXY CURING AGENT COMPRISING A METAXYLYLENEDIAMINE-EPICHLOROHYDRIN ADDUCT

[75] Inventors: Shailesh Shah, Dresher; Ronald J. Cash, North Wales; Ronald LaFreeda, Plymouth Meeting; James Aloye, Reading; Joseph L. Mulvey, Lansdale, all of Pa.

[73] Assignee: Henkel Corporation, Plymouth Meeting, Pa.

[21] Appl. No.: 733,453

[22] Filed: Oct. 18, 1996

[51] Int. Cl.⁶ .............................. C08L 63/00; C08L 63/02
[52] U.S. Cl. .......................... 523/404; 525/523; 525/526; 528/111; 528/361; 528/407; 428/413; 428/418
[58] Field of Search .................... 523/404; 525/523, 525/526; 528/111, 361, 407

[56] References Cited

U.S. PATENT DOCUMENTS

| | | | |
|---|---|---|---|
| 3,249,412 | 5/1966 | Kolek et al. | 65/3 |
| 3,301,804 | 1/1967 | Zora et al. | 260/29.2 |
| 3,634,348 | 1/1972 | Carter | 260/18 EP |
| 4,246,148 | 1/1981 | Shimp et al. | 260/18 EP |
| 4,315,044 | 2/1982 | Elmore et al. | 427/386 |
| 4,532,308 | 7/1985 | Sato et al. | 525/482 |
| 4,541,958 | 9/1985 | Miyamoto et al. | 260/404.5 |
| 4,605,765 | 8/1986 | Miyamoto et al. | 564/367 |
| 4,608,406 | 8/1986 | Williams, Jr. | 523/424 |
| 5,310,770 | 5/1994 | DeGooyer et al. | 523/414 |
| 5,356,961 | 10/1994 | Nishimura et al. | 523/414 |
| 5,444,127 | 8/1995 | Miskel, Jr. et al. | 525/504 |
| 5,591,812 | 1/1997 | Starner | 525/526 |

OTHER PUBLICATIONS

"Plasticizers", *Encyclopedia of Polymer Science and Engineering*, Supplement vol. pp. 568–647 (John Wiley & Sons, Inc., NY, NY, 1989).

"Water–Borne Epoxy Resin Coating Based on GASKAMINE 328 (3)", Mitsubishi Gas Chemical Co., Inc., Plastics Technology Center, Technical Service Report No. 2071G.

"Prevention of Surface Stickiness of Coating Films Cured with G–328", Mitsubishi Gas Chemical Co., Inc., Plastics Technology Center, Technical Service Report No. 5094G.

"Application of Polyamide Type Epoxy Resin Hardeners Based on G–328 for Paints", Mitsubishi Gas Chemical Co., Inc., Plastics Technology Center, Technical Service Report No. 5097G.

"Comparison of G–328 with IPDA as Blend Type Epoxy Resin Hardeners", Mitsubishi Gas Chemical Co., Inc., Plastics Technology Center, Technical Service Report No. 6054G.

"Application of Epoxy Resin Hardeners Based on G–328 for Civil Engineering and Construction", Mitsubishi Gas Chemical Co., Inc., Plastics Technology Center, Technical Service Report No. 5098G.

"Gaskamine 328 (G–328) as Epoxy Resin Hardeners", Mitsubishi Gas Chemical Co., Inc., Plastics Technology Center, Technical Service Reort No. 5096G.

"Bisphenol A Blend Type Epoxy Resin Hardeners Based on G–328", Mitsubishi Gas Chemical Co., Inc., Plastics Technology Center, Technical Service Report No. 5095G.

"Product Information: Gaskamine 328", Mitsubishi Gas Chemical Co., Inc. (Sep. 1992).

"Amine Epoxy Resin Curing Agent Offers Versatility", Kiichiro Seki, *Modern Paint and Coatings*, Mar. 1995, pp. 36–40.

"Epoxy Resin Hardener: Gaskamine 328 (G–328)", Mitsubishi Gas Chemical Co., Inc., Plastics Technology Center.

"Waterpoxy® 1401/Waterpoxy® 801", Quick–Dry Red Iron Oxide Primer For Salt Water Imersion.

"Waterpoxy® 1401/Waterpoxy® 801", Concrete Primer/Sealer.

"Waterpoxy® 1401/Waterpoxy® 801", Quick–Dry, Sandable Gray Primer.

"Waterpoxy®801", Water Reducible Epoxy Curing Agent.

"Waterpoxy® 1401", Epoxy Dispersion.

Materials Safety Data Sheet #4843 Waterpoxy 801.

Materials Safety Data Sheet #4843 WEX 13–402.

*Primary Examiner*—Fredrick Krass
*Attorney, Agent, or Firm*—Ernest G. Szoke; Wayne C. Jaeschke; Martin G. Meder

[57] ABSTRACT

It has been found that non-blushing coatings of high gloss, long pot life and fast cure time may be obtained by using an epoxy curing agent which comprises an epichlorohydrin-metaxylylenediamine reaction product selected from the group consisting of N,N'-bis(3-aminomethylbenzyl)-2-hydroxytrimethylenediamine, the higher oligomers of N,N'-bis(3-aminomethylbenzyl)-2-hydroxytrimethylenediamine and mixtures thereof and a melting point depressant such as a benzyl alcohol or water and an alcohol solvent and, optionally, a tertiary amine such as N,N'-bis(3-(dimethylamino)propyl)-urea.

15 Claims, No Drawings

EPOXY CURING AGENT COMPRISING A METAXYLYLENEDIAMINE-EPICHLOROHYDRIN ADDUCT

FIELD OF THE INVENTION

This invention relates to epoxy curing agents and their use.

BACKGROUND OF THE INVENTION

The use of liquid amine curing agents as room temperature curing agents for epoxy resins is well known in the art. Among the liquid amines used for this purpose is the reaction product of epichlorohydrin with an excess of m-xylylenediamine. The reaction to produce this material typically can carried out by adding epichlorohydrin to a mixture of 2 to 10 moles of m-xylylenediamine and aqueous alkali hydroxide. The salt formed is filtered off and the water is distilled away to leave an adduct which is mostly N,N'-bis(3-aminomethylbenzyl)-2-hydroxytrimethylenediamine along with some higher oligomers of N,N'-bis(3-aminomethylbenzyl)-2-hydroxytrimethylenediamine and the excess m-xylylenediamine (MXDA). The adduct is typically $H_2N[CH_2-\phi-CH_2CH(OH)CH_2NH]_nCH_2-\phi-CH_2NH_2$, wherein n ranges from 1 to 12, where the n=1 species is at 20 wt. %, the n=2 higher oligomer is at 12%, n=3 is 9%, n=4 is 7%, n=5 is 6% and n=6–12 is at 20%. The excess m-xylylenediamine, or n=0 $H_2NCH_2-\phi-CH_2NH_2$, is present at around 26 wt %, but is still about 60 mole % amine monomer. The excess m-xylylenediamine is retained in the commercial version of this material because is acts as melting point depressant, leaving the adduct plus MXDA liquid at room temperature, which simplifies meter, mix and dispense operations for the end user, as the adduct itself is a solid. However, this convenience comes at a cost, as the residual diamine monomer retains some of the drawbacks of the pure diamine: odor, bicarbonate blush formation, larger shrinkage on cure, less convenient mix ratios and short pot life. Formulations of the adduct plus MXDA with benzyl alcohol or esterified with dimer acid (or other carboxylic acid), reacted with a mono-epoxide, and mixed with 9% water and 13% propylene glycol monopropyl ether (amine hydrogen equivalent weight (AHEW)=234) are known, and they share some of the disadvantages of the adduct plus MXDA. In the past, the deleterious effects of the free amine in aqueous curing agent systems have been ameliorated by amidizing the reaction product of epichlorohydrin with an excess of m-xylylenediamine with dimer acid, as described above, which needlessly consumes active amine hydrogens, and then diluting the resulting polyamidoamine with water.

SUMMARY OF THE INVENTION

The invention relates to an epoxy curing agent composition, which comprises an epichlorohydrin-metaxylylenediamine reaction product essentially free of metaxylylenediamine, and a liquid hydroxyl-functional melting point depressant such as benzyl alcohol or water and an alcohol solvent and optionally, a tertiary amine such as N,N'-bis(3-(dimethylamino)propyl)-urea, as well as the use of, and method for making, such a curing agent.

DETAILED DESCRIPTION OF THE INVENTION

Based on actual tests, it has been found that essentially all the excess MXDA typically found in epichlorohydrin-MXDA reaction product epoxy curing agent may be replaced by an alternate, non-amine, liquid hydroxyl-functional melting point depressant such as benzyl alcohol or water and an alcohol solvent, yet the resulting epoxy curing agents still retain their liquidity at room temperature. Epoxy resin coatings produced with a curing agent comprising essentially MXDA-free epichlorohydrin-MXDA adduct and water and an aqueous alcohol solvent are hard and glossy, despite the fact that the amine hydrogen equivalent weight of the non-volatile portion is about double that of epichlorohydrin-MXDA containing unreacted MXDA. This should result in a halving of the crosslink density and produce an associated softening of epoxy coatings made with the present invention, but it doesn't. Further, the ratio of hydroxyls (a cure accelerator) to amine hydrogens in the non-volatile portion of the curing agent of the present invention is higher than that when excess MXDA is present, but the pot-life of mixtures of curing agents of the present invention and epoxy resins is long.

Most commercially available hardeners for epoxy coating systems, especially waterborne, have desirable long pot-life, but this is unfortunately associated with long cure times. The aqueous versions of the curing agents of this invention have relatively long pot-lives, about 2 hours and above, but with very fast set times: recoatablity in less than ½ hour.

The curing agents of this invention are prepared from two major components. The first component is an adduct of epichlorohydrin-MXDA, essentially free of excess MXDA, the second component is a liquid hydroxyl-functional melting point depressant that may be either a plasticizer alcohol or aqueous alcohol solvent. Optionally a third component, a cure accelerator, may be added. The nature of these components will be addressed in turn below.

The Amine Adduct

The adduct of epichlorohydrin-MXDA, both with and without excess MXDA, is known in the art and its manufacture is described by Miyamoto et al. in U.S. Pat. Nos. 4,605,765 and 4,541,958, both incorporated herein in their entirety as if set forth in full. In outline, a mixture of excess MXDA and the adduct of epichlorohydrin-MXDA is prepared by adding epichlorohydrin to a mixture of 2 to 10 moles of m-xylylenediamine and aqueous 50% alkali hydroxide at about 70° C. The alkali chloride by-product salt formed is filtered off and the water is distilled away to leave an adduct which is mostly N,N'-bis(3-aminomethylbenzyl) -2-hydroxytrimethylenediamine along with some higher oligomers of N,N'-bis(3-aminomethylbenzyl)-2-hydroxytrimethylenediamine and the excess m-xylylenediamine (MXDA). The adduct is typically $H_2N[CH_2-\phi-CH_2CH(OH)CH_2NH]_nCH_2-\phi-CH_2NH_2$, wherein $\phi$ is phenyl and n ranges from 1 to 12, where the n=1 species is at 20 wt. %, the n=2 higher oligomer is at 12%, n=3 is 9%, n=4 is 7%, n=5 is 6% and n=6–12 is at 20%. The excess m-xylylenediamine, or n=0 $H_2NCH_2-\phi-CH_2NH_2$, is present at around 26 wt %. The MXDA-free adduct is prepared by stripping the aforementioned mixture. Miyamoto et al., in 4,605,765 strip at 165°– 170° C. and $4\times10^{-3}$ mmHg. Without stripping, it is possible to produce adduct containing MXDA levels as low as 5.1 wt. %, albeit a viscous liquid. The preferred levels of MXDA in the present invention are no greater than 4.9 wt. % and preferably 2 wt. % or lower.

Liquid Hydroxyl-Functional Melting Point Depressants Generally

The liquid hydroxyl-functional melting point depressants of the invention produce good cures in combination with MXDA-free adduct, despite the reduction in reactive primary amine hydrogens that contribute to network formation when excess MXDA is used instead. It is not entirely understood why they work, and not wishing to be bound by any theory unless expressly noted otherwise, but the melting point depressants of the present invention have pendant hydroxyl groups which may cause association of the liquid melting point depressants via hydrogen bonding to the pendant amines of the adduct, liquefying it thereby. Alternately, exothermic liberation of heat on mixing the melting point depressants with the adduct may indicate an increase in entropy, explaining the reduced ability to crystallize. It should be noted that the mixture of N,N'-bis(3-aminomethylbenzyl)-2-hydroxytrimethylenediamine and its higher oligomers may not have a sharp crystalline melting point, as it may contain appreciable amounts of material in the form of a supercooled glass. Therefore the term "melting point depressant" may also be thought of as "liquefier" or "pour point depressant" or the like.

The desired melting point depressants of the present invention are of two types: 1) those that are substantially non-volatile plasticizer alcohols with high boiling points, intended to form bulk castings and potting materials and structural adhesives, coatings, mortars, and grouts and the like upon reaction with epoxy resins and 2) those that are substantially volatile, aqueous alcohol solvents, such as butanol and glycols and glycol ethers, when it is desired to produce epoxy resin based coatings. It is generally desired that both classes of melting point depressants contain at least one ingredient that has a pendant hydroxyl group to act as a epoxy cure accelerator.

Plasticizer Alcohols

Of the substantially non-volatile melting point depressants, benzyl alcohol is typical. If less than 38 wt. % is used, more typically less than 29 wt. % and most typically less than 19 wt. %, then there is a risk that the viscosity of the curing agent is too high to be useful. However, too much benzyl alcohol, say in excess of 60%, more typically above 70 wt. % and most typically above 80 wt. %, will result in an overly-plasticized epoxy, which might be too soft or tacky when cured. It has been found that a good result may be had with 47.5% benzyl alcohol. Note that other liquid alcohols and phenols may be used instead of benzyl alcohol, and the skilled practitioner will realize that the optimal concentration will vary from that for benzyl alcohol. Examples of such alternate melting point depressants include phenylethylalcohol, phenoxyethanol, phenoxypropanol, cyclohexanol, salicyl alcohol, nonyl phenol, octyl alcohol, furfuryl alcohol, tetrahydrofurfuryl alcohol and the like.

Aqueous Alcohol Solvents

The second, volatile, type of melting point depressant is used in the formulation of environmentally safer, water based epoxy coatings. It comprises water and at least one alcohol solvent such as butanol or other lower aliphatic alcohols, glycols and glycol ethers. If too little water is used in the total formulation, less than 35 wt. %, more typically less than 25 wt. % and most typically less than 20 wt. %, a very high viscosity, difficult to handle, curing agent might be result. If too much water is used, for example above 40 wt. %, more typically above 70 wt. % and most typically above 80 wt. %, the resulting coating will have too low a solids content and it may be difficult to achieve sufficient build. It has been found that a concentration of about 35% water works well. It should also be noted that if the amount of water is too low, or non-existent, a less environmentally safe system would result since one would need to use volatile organic solvents to help lower the viscosity to a useful range.

The alcohol solvent should have at least one pendant hydroxyl group, to provide for cure acceleration in the epoxy coating after the water has evaporated. Also, it should be soluble in water, which will generally include the use of lower aliphatic alcohols, glycols and glycol ethers. Propylene glycol monomethyl ether is used in the examples below. It has been found that about 5 wt. % works well, in providing water dilutability without creating unnecessary haze and therefore incipient insolubility. The concentration of propyleneglycol monomethyl ether in the total formulation may be varied from about 1 wt. % to about 40 wt. %, more typically about 1 wt % to about 10 wt. % and most typically about 3 wt. % to about 7 wt. %. Note that other alcohol solvents may be used instead of propylene glycol monomethyl ether (PGM), and the skilled practitioner will realize that the optimal concentration will vary from that for PGM. Examples of such solvents include n-butanol, sec-butanol, tert-butanol, 2-ethoxyethanol, propylene glycol, propylene glycol monoethyl ether, propylene glycol monopropyl ether, diethylene glycol monomethyl ether, ethylene glycol monobutyl ether, ethylene glycol monomethyl ether, ethylene glycol monopropyl ether, diethylene glycol monoethyl ether, diethylene glycol monobutyl ether, tripropylene glycol monomethyl ether and the like.

Cure Accelerators

A cure accelerator may optionally be added. Such an accelerator will serve to reduce the time for the coating to become tack-free. The tertiary amine is also useful for lowering the actual AHEW, when measured by maximum $T_g$ (glass transition temperature), thus resulting in a lower total cost, as the epoxy resin is generally lower cost than the above amine adduct. Useful accelerators for amine curing agents include tertiary amines, e.g. N,N'-bis(3-(dimethylamino)propyl)-urea, which was used in the examples below. The use of this tertiary amine has been described by Miskel et al. in U.S. Pat. No. 5,444,127, which is incorporated herein in its entirety as if set forth in full. Other commercially available tertiary amines that may be used as cure catalysts include 2,4,6 tri (dimethylaminomethyl) phenol, dimethylaminomethylphenol, benzyldimethylamine, pyridine, triethylamine, triethylene diamine and the like. They are typically used at levels ranging from about 0.5 wt. % to about 10 wt. %, more typically about 1 wt. % to about 6 wt. % and most typically about 2 wt. % to about 4 wt. %. A concentration of about 3 wt. % has been found useful when N,N'-bis(3-(dimethylamino)propyl)-urea is used. Too high a level of accelerator has been found not to improve the set times any further. In fact high levels can introduce water sensitivity and additional costs.

Epoxy Resins Generally

The epoxy curing agents of the present invention are intended for use in combination with epoxy resins. The plasticizer alcohol versions of the curing agents of the present invention are intended for use with substantially solvent free or "neat" epoxy resins to make bulk castings potting materials, structural adhesives, coatings, mortars, and grouts and the like. The aqueous alcohol solvent versions of the curing agents of the present invention are intended for use with aqueous epoxy resin dispersions of emulsifiable epoxies to make coatings, as described below.

Coating Compositions Comprising the Water-Alcohol Curing Agents and an Aqueous Dispersion Curable Epoxy Resin The coating composition of the invention is prepared by combining the water-glycol curing agents of the present invention with a second component that is a suitable aqueous epoxy resin dispersion. The coatings are tack free after 1.5 hours or less even when applied as 6 mil thick coatings and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a water-alcohol solvent curing agent as described above with an epoxy dispersion composition second component. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable second component epoxy resins are those which are soluble or dispersible (either alone or in the presence of a co-solvent) or supplied in water and which contain at least 2 glycidyl ether groups per molecule. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A. Examples of suitable resins include those disclosed in U.S. Pat. Nos. 3,249,412, 3,301,804, 3,634,348, 4,315,044, and 4,608,406, the disclosures of all incorporated herein by reference. Particularly preferred epoxy resins include those disclosed in U.S. patent application Ser. No. 08/086,288, and now abandoned entitled "Self-Dispersing Curable Epoxy Resins, Dispersions Made Therewith, and Coating Compositions Made Therefrom", filed on Jun. 30, 1993, the disclosure of which is incorporated herein by reference. The epoxy resin dispersions of example 3 of this application are preferred and comprise the reaction product of reactants consisting of the adduct of the polyepoxide of propoxylated (5PO) pentaerythritol and Texaco Jeffamine 2070 polyethoxy amine, diglycidyl ether of bis-phenol A, bis-phenol A and triphenyl phosphine which is then diluted with water, propylene glycol methyl ether and C8–C10 alcohol monoglycidyl ether.

The maximum molecular weight of the epoxy resins is limited by the fact that the amount of epoxy resin employed in the second component is usually selected to achieve stoichiometric equivalence of epoxy groups with the amine hydrogen equivalents of the curing agent. Consequently, as the molecular weight of the epoxy resin increases, thereby increasing the epoxide equivalent weight, more of the epoxy resin is required to satisfy the stoichiometric requirement. However, the use of large amounts, particularly of higher molecular weight epoxy resins, is not preferred because they are water insoluble and become increasingly more difficult to microemulsify or disperse as the amount thereof is increased.

In view of the above, it is preferred to characterize the epoxy resin also in terms of its epoxide equivalent weight. Thus, the epoxide equivalent weight (EEW) of the glycidyl polyethers of dihydric phenols is not greater than about 2000, preferably from about 180 to about 700.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive amine hydrogen equivalent weight ratio of from about 0.5:1.0 to about 1.5:1.0, and, preferably, from about 0.8:1.0 to about 1.2:1.0.

The epoxy resins which are useful herein, may be either liquids or solids, so long as the resin is in the form of a stable aqueous dispersion or are readily emulsifiable.

When the epoxy resin and the curing agent are mixed, the resulting coating composition exhibits a useful pot life at room temperature, e.g. from about 1 hour to about 8 hours, and more typically from about 2 hours to about 3 hours. The pot life of the coating composition is herein defined to be the elapsed time from mixing the components together until the resulting composition doubles in viscosity. In most cases, application by spray, brush, or roll coating techniques to a substrate becomes more difficult after the end to pot life. The suitability for application by common techniques can be expressed in terms of the viscosity of the coating composition. Useful applications viscosities are between 50 and 140 Kreb Units (K.U.) as determined with a Stormer viscometer.

Coatings based on the compositions described herein can be formulated into easily handled two-package systems which blend together as easily as their solvent based counterparts. Application by brush, spray and roller-coating are typically free of bubbling and other film imperfections.

The coating systems described herein should also exhibit good adhesion to such widely varied substrates as galvanized metal, cold rolled steel (untreated and phosphate treated), hot rolled steel, glass, concrete and aluminum. Flash rusting is not a problem over untreated steel and, therefore, there is no need for special additives as in some water reducible epoxy systems. Adhesion should also be excellent to three and four-year old alkyd and epoxy ester enamel films. Such systems may therefore be employed for repaint purposes in food processing plants and dairies and can also be used as adhesive compositions per se.

As pointed out above, a major advantage of the coating compositions of the instant invention is that they are useful in preparing solvent and chemically resistant coating compositions from aqueous based systems. These systems do not exhibit the traditional solvent related problems shown by solvent based systems and accordingly are preferred in end-use applications where nonpolluting or nonflammable coatings systems are necessary. In addition, the cured state properties of compounds made from the curing agents disclosed herein are generally equivalent or superior to the properties of compounds prepared from prior art solvent based systems.

Neat Epoxy Resins

Neat epoxies, including those listed below, would be used at about one epoxide equivalent weight of epoxy to about one amine hydrogen equivalent weight of the plasticizer alcohol curing agents of the invention. The neat epoxy resins, "neat" as in substantially solvent free used in the practice of this invention comprise one or more polyglycidyl ethers of polyhydric phenols having two (2) or more epoxide groups and one (1) or more six-carbon aromatized rings present in the molecule, as represented by the structural formula:

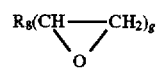

wherein $R_8$ represents a 'g' valent $C_6$–$C_{50}$ organic radical comprising at least one six-carbon aromatized ring (e.g. when g is 2, $R_5$ can be —$CH_2$—O—$\phi$—C($CH_3$)$_2$—$\phi$—O—$CH_2$— or $R_5$ can be —$CH_2$—O—$\phi$—$CH_2$—$\phi$—O—$CH_2$— wherein $\phi$ represents a phenyl group), and 'g' is equal to or greater than 2 but less than or equal to about 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. ™) epoxy resins from Shell Chemical Company, Houston, Texas, and DER (Reg. ™) or DEN (Reg. ™) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$–$C_{18}$ (preferably $C_1$–$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

Also useful, when high resistance to ultraviolet light (UV) is desired, are the hydrogenated bisphenol A diglycidyl ethers, an example of which is Eponex 1510 (™ Shell Chemical Co.), or aliphatic polyglycidyl ethers, an example of which is trimethylol propane triglycidyl ether, sold as GE-30 (CVC Specialties) and as Heloxy Modifier 48 (™ Shell Chemical Co.).

Additives to bulk epoxy systems that can be made from the plasticizer alcohol curing agents of the invention and neat epoxy resins are many; among them are colorants, fillers, reinforcements, coupling agents, flexibilizers, diluents, flame retardants, rheology modifiers, release agents and the like. Formulations based on the plasticizer alcohol embodiments of the invention exhibit extremely fast cure times and hardness development. They also combine high chemical resistance with excellent resistance to blush and water spotting, even at high humidity/low temperature conditions. Applications include chemically resistant, aesthetic topcoats, low temperature cure formulations, and secondary containment.

Co-Curing Agents

The epoxy curing agents may be used in combination with other water soluble or water disperable curing agents. Suitable polyamine co-curing agents are those which are soluble or dispersible in water and which contain more than 2 active hydrogen atoms per molecule. Examples of such curing agents are alkylene polyamines represented by the formula $H_2N$—T—$(NH$—$T)_u NH_2$, wherein 'T' is an alkylene radical containing about 2 to about 8 carbon atoms and 'u' is equal to or greater than zero (0) but less than or equal to about five (5). Such alkylene polyamines include ethylene diamine, diethylene triamine, triethylene tetramine, tetraethylene pentamine, pentaethylene hexamine, propylene diamine, dibutylene triamine, hexamethylene diamine and their ethoxylated and propoxylated adducts and the like. Included, also, among usable co-curing agents are aminoethylpiperazine, 2-methylpentanediamine, polyethyleneimine and cycloaliphatic amines.

Examples of useful co-curing agents also include those disclosed in U.S. patent application Ser. No. 08/085,861, filed Jun. 30, 1993, entitled "Curing Agents for Aqueous Epoxy Resins", and now U.S. Pat. No. 5,583,167 by Jason Chou et al., the disclosure of which is incorporated herein by reference. These epoxy curing agents comprise the reaction product of reactants consisting essentially of an alkylene polyamine having less than about 12 carbon atoms, an aromatic monoglycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic monoglycidyl ether to epoxide equivalents of said diglycidyl ether of an aromatic diol is greater than one.

Another useful co-curing agent is that described by Nishimura et al. in U.S. Pat. No. 5,356,961, the disclosure of which is incorporated herein in its entirety by reference, as if set forth in full, which shows that the adduct of epichlorohydrin-MXDA and excess MXDA may be reacted with dimer acid (or other organic acid) to yield a polyamidoamine that is then mixed with water to form an aqueous epoxy curing agent.

Also useful are polyalkyleneoxide amines such as polyethylene oxide amines like triethyleneglycol diamine, polyethyleneoxide-co-propylene oxide amines and lower molecular weight polypropyleneoxide di- and tri-amines.

The plasticizer alcohol embodiments of the invention are not generally used with aqueous solutions or dispersions of curing agents but, can, and are, used with the water soluble amines described above. Additionally, they may be cured with substantially water insoluble amines such as fatty acid and dimerized fatty acid polyamidoamines as a very efficient accelerator, and with dimerized fatty diamine and amine-terminated polybutadiene and polybutadiene-co-acrylonitrile.

The following examples will serve to further illustrate the invention, but should not be construed to limit the invention, unless expressly set forth in the appended claims. The reactants and other specific ingredients are presented as being typical, and various modifications can be derived in view of the foregoing disclosure within the scope of the invention. All parts, percentages, and ratios are by weight unless otherwise indicated in context.

EXAMPLES

Example 1

A water reducible epoxy curing agent designed to be combined with epoxy resin water dispersions was prepared by mixing 57.5 wt. % stripped epichlorohydrin-metaxylylenediamine adduct with 5 wt. % propylene glycol monomethyl ether and 2.5 wt. % N,N'-bis(3-(dimethylamino)propyl)-urea tertiary amine, balance (35 wt. %) water. The resulting liquid had the following properties: a viscosity at 25° C. of 4 poise, 59–61 wt. % solids, a Gardner color of 2, an amine hydrogen equivalent weight (on solids) of 54.7, an amine hydrogen equivalent weight (as formulated) of 91, and a density of 1.07 g/cc.

Example 2

A two component quick-dry red iron oxide primer for salt water immersion is formulated using the curing agent of Example 1. Component I is made by adding to a high speed disperser 183.44 kg of Waterpoxy 1401 brand epoxy dispersion (™ Henkel Corporation) which typically has an epoxide equivalent weight (on solids) ranging from 510 to 540 and a solids content ranging from 55 to 57 wt. %, 1.88 kg propylene glycol n-propyl ether, 1.45 kg Foamaster® WBA brand defoamer, a mineral oil based blend of silica derivatives and organic hydrophobes (™ Henkel Corporation), 48.15 kg J3106 red iron oxide (Mineral Pigments Corporation), 48.15 kg Wollastocoat® 10ES (™ Nyco Minerals, Inc.), 23.96 kg Halox® SZP-391 (™ Halox Pigments) and 74.63 kg Nytal® 300 brand hydrous magnesium silicate (™ R. T. Vanderbilt Company), all dispersed to 5+ Hegman at high speed. To the above is added 68.96 kg de-ionized water; the quantity of water can be adjusted to obtain a desired grind viscosity.

Component II is made by mixing 17.74 kg of the epoxy curing agent of Example 1 with 17.99 kg propylene glycol n-propyl ether and then adding 38.81 kg de-ionized water.

For application, 1 part of Component II is added to 4 parts of Component I, by volume, with agitation. The combined formulation has the following properties: 58.97 wt. % solids, 41.97 vol. % solids, 173.70 grams/liter VOC (volatile organic content), a density of 1.38 g/cc, a Stormer viscosity of 70 KU, and the curing rates (3 mils wet—BK Recorder) were 30 minutes to tack free and 2 hours to through cure. The resulting coating was subjected to salt water immersion (Instant Ocean) at 49° C. for 2 months and the result showed essentially no scribe creep or field blisters.

Example 3

A two component concrete primer/sealer is formulated using the curing agent of Example 1. Component I is made by adding the following to an appropriate size container with low speed agitation: 209.62 kg of Waterpoxy 1401 epoxy dispersion (™ Henkel Corporation) which typically has an epoxide equivalent weight (on solids) ranging from 510 to 540 and a solids content ranging from 55 to 57 wt. %, 7.11 kg propylene glycol methyl ether acetate, 2.27 kg Foamaster® WBA brand defoamer, a mineral oil based blend of silica derivatives and organic hydrophobes (™ Henkel Corporation) and 82.06 kg de-ionized water. Then add 17.94 kg Nopco® DSX® 1550 brand associative thickener, a hydrophobe modified urethane ethoxylate (™ Henkel Corporation) with good agitation. Component I has a Brookfield RVT viscosity of 505 cps.

Component II is made by adding the following to an appropriate size container with low speed agitation: 16.31 kg of the epoxy curing agent of Example 1, 13.27 kg ethylene glycol propyl ether, 4.41 kg 2,4,6-tris(dimethylaminomethyl)phenol and 41.41 kg de-ionized water. Component II has a Brookfield RVT viscosity of 37.5 cps.

For application, 1 part of Component II is added to 4 parts of Component I, by volume, with agitation. The combined formulation has the following properties: 35.76 wt. % solids, 32.09 vol. % solids, 243.34 grams/liter VOC, a density of 1.04 g/cc and has a Brookfield RVT viscosity of 122.0 cps. Set-to-touch time (3 mils wet) is 1 hour, the tack-free time (6 wet mils—BK Recorder) is 1.5 hours and the through cure time (6 wet mils—BK Recorder) is also 1.5 hours. On typical porous damp concrete, one could topcoat this primer in as short a time as 15 minutes.

Example 4

A two component quick-dry red iron oxide primer for salt water immersion is formulated using the curing agent of Example 1. Component I is made by adding to a high speed disperser 183.44 kg of an epoxy dispersion as in Example 3, described above, from a related application entitled "Self-Dispersing Curable Epoxy Resins, Dispersions Made Therewith, and Coating Compositions Made Therefrom", Ser. No. 08/086,288, filed on Jun. 30, 1993, and now abandoned incorporated herein by reference as if set forth in full. 1.88 kg propylene glycol n-propyl ether, 1.45 kg Foamaster® WBA brand defoamer, a mineral oil based blend of silica derivatives and organic hydrophobes (™ Henkel Corporation), 48.15 kg J3106 red iron oxide (Mineral Pigments Corporation), 48.15 kg Wollastocoat® 10ES (™ Nyco Minerals, Inc.), 23.96 kg Halox® SZP-391 (™ Halox Pigments) and 74.63 kg Nytal® 300 hydrous magnesium silicate (™ R. T. Vanderbilt Company), all dispersed to 5+ Hegman at high speed. To the above is added 68.96 kg de-ionized water; the quantity of water can be adjusted to obtain a desired grind viscosity.

Component II is made by mixing 17.74 kg of the epoxy curing agent of Example 1 with 17.99 kg propylene glycol n-propyl ether and then adding 38.81 kg de-ionized.

For application, 1 part of Component II is added to 4 parts of Component I, by volume, with agitation.

Example 5

A two component concrete primer/sealer is formulated using the curing agent of Example 1. Component I is made by adding the following to an appropriate size container with low speed agitation: 209.62 kg of an epoxy dispersion as in Example 3, described above, from a related application entitled "Self-Dispersing Curable Epoxy Resins, Dispersions Made Therewith, and Coating Compositions Made Therefrom", Ser. No. 08/086,288, filed on Jun. 30, 1993, and now abandoned 7.11 kg propylene glycol methyl ether acetate, 2.27 kg Foamaster® WBA brand defoamer, a mineral oil based blend of silica derivatives and organic hydrophobes (™ Henkel Corporation) and 82.06 kg de-ionized water. Then add 17.94 kg Nopco® DSX® 1550 brand associative thickener, a hydrophobe modified urethane ethoxylate (™ Henkel Corporation) with good agitation.

Component II is made by adding the following to an appropriate size container with low speed agitation: 16.31 kg of the epoxy curing agent of Example 1, 13.27 kg ethylene glycol propyl ether, 4.41 kg 2,4,6-tris (dimethylaminomethyl)phenol and 41.41 kg de-ionized water. Component II has a Brookfield RVT viscosity of 37.5 cps.

For application, 1 part of Component II is added to 4 parts of Component I, by volume, with agitation.

Example 6

A two component quick-dry, sandable gray primer is formulated using the curing agent of Example 1. Component I is made by adding to a high speed disperser 173.48 kg of Waterpoxy 1401 brand epoxy dispersion (™ Henkel Corporation) which typically has an epoxide equivalent weight (on solids) ranging from 510 to 540 and a solids content ranging from 55 to 57 wt. %, 11.36 kg ethylene glycol propyl ether, 1.36 kg Foamaster® WBA brand defoamer, a mineral oil based blend of silica derivatives and organic hydrophobes (™ Henkel Corporation), 0.68 kg 896-9901 lampblack (Huels-America, Inc.), 50 kg barytes #106 (Whittaker, Clark and Daniels), 45.45 kg TiPure R-960 (™ DuPont), 34.09 kg Halox® SZP-391 (™ Halox Pigments) and 70.91 kg Nytal® 300 brand hydrous magnesium silicate (™ R. T. Vanderbilt Company), all dispersed to 5+ Hegman at high speed. To the above is added 68.79 kg de-ionized water; the quantity of water can be adjusted to obtain a desired grind viscosity.

Component II is made by mixing 16.81 kg of the epoxy curing agent of Example 1 with 17.03 kg ethylene glycol propyl ether and 54.22 kg Nytal® 300 brand hydrous magnesium silicate (™ R. T. Vanderbilt Company) and then adding 22.48 kg deionized water.

For application, 1 part of Component II is added to 4 parts of Component I, by volume, with agitation. The combined formulation has the following properties: 64.2 wt. % solids, 45.2 vol. % solids, 193 grams/liter VOC, a density of 1.49 g/cc, and the curing rates were 30 minutes to dry-to-touch and 2 hrs to sandable cure.

Example 7

A two component quick-dry, sandable gray primer is formulated using the curing agent of Example 1. Component I is made by adding to a high speed disperser 173.48 kg of an epoxy dispersion, described above, from a related application entitled "Self-Dispersing Curable Epoxy Resins, Dispersions Made Therewith, and Coating Compositions Made Therefrom", Ser. No. 08/086,288, as in Example 3 of that application, filed on Jun. 30, 1993, and now abandoned 11.36 kg ethylene glycol propyl ether, 1.36 kg Foamaster® WBA brand defoamer, a mineral oil based blend of silica derivatives and organic hydrophobes (™ Henkel Corporation), 0.68 kg 896-9901 lampblack (Huels-America, Inc.), 50 kg barytes #106 (Whittaker, Clark and Daniels), 45.45 kg TiPure R-960 (™ DuPont), 34.09 kg Halox® SZP-391 (™ Halox Pigments) and 70.91 kg Nytal® 300 brand hydrous magnesium silicate (™ R. T. Vanderbilt Company), all dispersed to 5+ Hegman at high speed. To the above is added 68.79 kg de-ionized water; the quantity of water can be adjusted to obtain a desired grind viscosity.

Component II is made by mixing 16.81 kg of the epoxy curing agent of Example 1 with 17.03 kg ethylene glycol propyl ether and 54.22 kg Nytal® 300 brand hydrous magnesium silicate (™ R. T. Vanderbilt Company) and then adding 22.48 kg deionized water.

For application, 1 part of Component II is added to 4 parts of Component I, by volume, with agitation.

Example 8

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % N,N'-bis(3-(dimethylamino)propyl)-urea tertiary amine. The resulting liquid, and castings and coatings made from it with an EEW 190 diglycidylether of bisphenol A type epoxy such as DER 331 (™ Dow Chemical Co.), had the following typical properties:

| | |
|---|---|
| Amine Value - mg KOH/gm | 310–360 |
| Viscosity at 25° C. - poise | 6–10 |
| Color | 6 |
| AHEW, based on max. $T_g$ | 123.5 |
| Mix Ratio w/190 EEW Liquid Epoxy - phr | 65 |
| Density, g/cc | 1.07 |
| Gel Time (200 g mass) - minutes[1] | 18–21 |
| Tack Free, 6 mils, BK Recorder - hours[1] | 1.6 |
| Through Cure, 6 mils - hours[1] | 2.3 |
| Typical Cured Resin Properties[1,2] | |
| Tensile Strength, psi (ASTM D638-82A) | 8570 |
| Tensile modulus, psi | 209000 |
| Percent Elongation, | 5.1 |
| Flexural Strength, psi (ASTM D790-81) | 13550 |
| Flexural Modulus, psi | 497000 |
| Compressive Strength, psi (ASTM D 695-80) | 8180 |
| Glass Transition Temperature by DSC (ASTM 3418) | 85° C. |

Typical Chemical Resistance Properties of Unfilled Castings[1]

| | 7 Day Immersion | | 21 Day Immersion | |
|---|---|---|---|---|
| | % weight change | % hardness retained | % weight change | % hardness retained |
| 70% Sulfuric | −1.15 | 98.1 | −1.12 | 100 |
| 50% Acetic | — | 49.8 | — | — |
| 37% HCl | +4.84 | 89.8 | +5.85 | 90.2 |
| MEK | +5.40 | 60.6 | — | — |
| Ethanol | +.75 | 70.7 | +2.41 | 73.1 |

[1] with 190 EEW epoxy resin
[2] cured 7 days at 25° C.

Example 9

An epoxy curing agent designed to be combined with liquid neat epoxy resins was prepared by mixing 76 wt. % stripped epichlorohydrin-metaxylylenediamine adduct with 19 wt. % benzyl alcohol and 5 wt. % N,N'-bis(3-(dimethylamino)propyl)-urea tertiary amine. The resulting liquid had a high, but unmeasured viscosity.

Example 10

An epoxy curing agent designed to be combined with liquid neat epoxy resins was prepared by mixing 66.5 wt. % stripped epichlorohydrin-metaxylylenediamine adduct with 28.5 wt. % benzyl alcohol and 5 wt. % N,N'-bis(3-(dimethylamino)propyl)-urea tertiary amine. The resulting liquid had a viscosity of 96.25 poise.

Example 11

An epoxy curing agent designed to be combined with liquid neat epoxy resins was prepared by mixing 57 wt. % stripped epichlorohydrin-metaxylylenediamine adduct with 38 wt. % benzyl alcohol and 5 wt. % N,N'-bis(3-(dimethylamino)propyl)-urea tertiary amine. The resulting liquid had a viscosity of 23.75 poise.

Example 12

An epoxy curing agent designed to be combined with liquid neat epoxy resins was prepared by mixing 57 wt. % stripped epichlorohydrin-metaxylylenediamine adduct with 38 wt. % benzyl alcohol and 5 wt. % N,N'-bis(3-(dimethylamino)propyl)-urea tertiary amine. It was formulated as 50.79 phr with DER 331 and had a gel time of 21 minutes, a tack-free time 1.33 hours and a through-cure at 2.1 hours.

Example 13

An epoxy curing agent designed to be combined with liquid neat epoxy resins was prepared by mixing 57 wt. % stripped epichlorohydrin-metaxylylenediamine adduct with 38 wt. % benzyl alcohol and 5 wt. % N,N'-bis(3-(dimethylamino)propyl)-urea tertiary amine. The resulting liquid was formulated as though it had an AHEW of 123.68 with stoichiometric DER 331 and had a gel time of 16.4 minutes, a tack-free time 1.75 hours and a through-cure at 2.12 hours.

Example 14

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % N,N'-bis(3-(dimethylamino)propyl)-urea tertiary amine. The resulting liquid had a viscosity of 7.625 poise.

Example 15

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % N,N'-bis(3-(dimethylamino)propyl)-urea tertiary amine. It was formulated as 60.94 phr with DER 331 and had a gel time of 19 minutes, a tack-free time of 2.6 hours and a through-cure at 2.6 hours.

Example 16

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % N,N'-bis(3-(dimethylamino)propyl)-urea tertiary amine. The resulting liquid was formulated as though it had an AHEW of 148.2 with stoichiometric DER 331 and had a gel time of 18 minutes, a tack-free time of 1.69 hours and a through-cure at 2.25 hours.

Example 17

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % N,N'-bis(3-(dimethylamino)propyl)-urea tertiary amine. The resulting liquid had a viscosity of 8.5 poise, an amine value of 334.4 mg KOH/g and was clear. It was formulated with stoichiometric DER 331 and had a tack-free time of 1.62 hours and a through-cure at 2.3 hours. It was then formulated with stoichiometric DER 324 (™ Dow Chemical Co.), which is a blend of DER 331 and 18% C12–C14 aliphatic monepoxide diluent, and had a tack-free time of 2.7 hours and a through-cure at 3.5 hours.

Example 18

An epoxy curing agent designed to be combined with liquid neat epoxy resins was prepared by mixing 47.5 wt. % stripped epichlorohydrin-metaxylylenediamine adduct with 47.5 wt. % benzyl alcohol and 5 wt. % 2,4,6 tri (dimethylaminomethyl) phenol tertiary amine. It was formulated with stoichiometric DER 331 to make a 6 mil film that had a gel time at 25° C. of 15 minutes, 20 seconds, a tack-free time of 1.1 hours and a through-cure at 1.7 hours and no blush. The tack-free time at 10° C. was 3.9 hours and through-cure was at 6.6 hours.

Example 19

An epoxy curing agent designed to be combined with liquid neat epoxy resins was prepared by mixing 50 wt. % stripped epichlorohydrin-metaxylylenediamine adduct with 50 wt. % benzyl alcohol. It was formulated with stoichiometric DER 331 to make a 6 mil film that had a gel time at 25° C. of 17 minutes, 55 seconds, a tack-free time of 1.3 hours and a through-cure at 1.7 hours and no blush. The tack-free time at 10° C. was 3.4 hours and through-cure was at 7.1 hours.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An epoxy curing agent composition which is a reaction product produced by reacting components consisting of about 2 to about 10 moles of unreacted metaxylylenediamine and about 1 mole of epichlorohydrin, wherein said reaction product contains no greater than 4.9 weight percent metaxylylenediamine, and an aqueous alcohol solvent, wherein the water contributed by the aqueous alcohol solvent is present from about 20 to about 80 weight percent, based on the weight of said composition.

2. The epoxy curing agent composition of claim 2, comprising about 35 weight percent water.

3. The epoxy curing agent composition of claim 1, wherein the alcohol in the aqueous alcohol solvent comprises from about 1 to about 40 weight percent of the curing agent composition.

4. The epoxy curing agent composition of claim 1, wherein the alcohol in the aqueous alcohol solvent comprises about 5 weight percent of the curing agent composition.

5. The epoxy curing agent composition of claim 1, wherein the alcohol is propylene glycol monomethyl ether.

6. The epoxy curing agent composition of claim 1, wherein the alcohol is selected from the group consisting of n-butanol, sec-butanol, tert-butanol, 2-ethoxyethanol, propylene glycol, propylene glycol monoethyl ether, propylene glycol monopropyl ether, diethylene glycol monomethyl ether, ethylene glycol monobutyl ether, ethylene glycol monomethyl ether, ethylene glycol monopropyl ether, diethylene glycol monoethyl ether, diethylene glycol monobutyl ether, tripropylene glycol monomethyl ether and mixtures thereof.

7. A coating composition comprising an aqueous dispersion of an epoxy resin and an effective amount of the curing agent composition of claim 1.

8. A method of coating a substrate comprising contacting a surface of a substrate with the coating composition of claim 7.

9. The method of claim 8 wherein the resulting coating is continuous and said substrate is a rigid architectural substrate.

10. The epoxy curing agent composition of claim 1 further comprising a tertiary amine cure accelerator.

11. The epoxy curing agent composition of claim 10, wherein the tertiary amine cure accelerator is selected from the group consisting of 2,4,6-tri(dimethylaminomethyl) phenol, N,N'-bis(3-dimethylamino)propyl-urea and mixtures thereof.

12. The epoxy curing agent composition of claim 10, wherein the tertiary amine cure accelerator is selected from the group consisting of dimethylaminomethylphenol, benzyldimethylamine, pyridine, triethylamine, triethylene diamine and mixtures thereof.

13. The epoxy curing agent composition of claim 10, wherein the tertiary amine accelerator comprises from about 0.5 to about 10 weight percent of the curing agent composition.

14. The epoxy curing agent composition of claim 10, wherein the tertiary amine cure accelerator comprises from about 3 to about 5 weight percent of the curing agent composition.

15. The epoxy curing agent composition of claim 10, which comprises:

(1) an epichlorohydrin-metaxylylenediamine reaction product that contains less than about 2 weight percent unreacted metaxylylenediamine;

(2) about 35 weight percent water;

(3) about 5 weight percent propylene glycol monomethyl ether; and (4) about 3 weight percent N,N'-bis(3-dimethylamino) propyl-urea, all percentages being based on the weight of the curing agent composition.

* * * * *